United States Patent
Kodera et al.

(10) Patent No.: US 12,389,193 B2
(45) Date of Patent: Aug. 12, 2025

(54) DATA COLLECTION DEVICE, DATA COLLECTION METHOD, AND DATA COLLECTION SYSTEM

(71) Applicant: TOYOTA JIDOSHA KABUSHIKI KAISHA, Toyota (JP)

(72) Inventors: Hiroaki Kodera, Susono (JP); Yoichiro Isami, Mishima (JP); Kotoru Sato, Susono (JP); Takashi Hayashi, Nagoya (JP); Naohiro Seo, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/748,194

(22) Filed: May 19, 2022

(65) Prior Publication Data

US 2023/0016961 A1 Jan. 19, 2023

(30) Foreign Application Priority Data

Jul. 19, 2021 (JP) ................. 2021-118938

(51) Int. Cl.
*H04W 4/021* (2018.01)
*H04W 4/024* (2018.01)
*H04W 4/38* (2018.01)
H04W 84/06 (2009.01)

(52) U.S. Cl.
CPC .......... *H04W 4/021* (2013.01); *H04W 4/024* (2018.02); *H04W 4/38* (2018.02); *H04W 84/06* (2013.01)

(58) Field of Classification Search
CPC ....... H04W 4/021; H04W 4/024; H04W 4/38; H04W 84/06
See application file for complete search history.

(56) References Cited

U.S. PATENT DOCUMENTS

| | | | | |
|---|---|---|---|---|
| 2013/0046456 | A1* | 2/2013 | Scofield | G08G 1/096838 701/117 |
| 2014/0278086 | A1* | 9/2014 | San Filippo | G01C 21/3492 701/527 |
| 2016/0063642 | A1* | 3/2016 | Luciani | G06Q 40/08 705/4 |
| 2017/0092109 | A1* | 3/2017 | Trundle | B64D 47/04 |
| 2017/0256171 | A1* | 9/2017 | Thomas | G08G 5/0039 |
| 2017/0286887 | A1* | 10/2017 | Moran | G08G 5/55 |
| 2018/0005337 | A1* | 1/2018 | Kreiner | H04W 4/02 |

(Continued)

FOREIGN PATENT DOCUMENTS

JP 2011221959 A 11/2011
JP 2013134663 A 7/2013
(Continued)

*Primary Examiner* — Steven Hieu D Nguyen
(74) *Attorney, Agent, or Firm* — Sughrue Mion, PLLC

(57) ABSTRACT

A data collection device collects data in a predetermined target area by using a plurality of mobile bodies that is able to move within the target area and acquire data. The data collection device includes: an information acquisition unit that acquires area information regarding the target area; and a mobile body management unit that changes a collection location of the data based on the area information and that dispatches at least one mobile body among the mobile bodies to a specific location in the target area associated with the area information.

9 Claims, 12 Drawing Sheets

(56) References Cited

U.S. PATENT DOCUMENTS

| | | | | |
|---|---|---|---|---|
| 2018/0286239 A1* | 10/2018 | Kaloyeros | ............ | G06V 20/182 |
| 2020/0165150 A1* | 5/2020 | Mundy | ................... | C03B 17/04 |
| 2020/0173808 A1* | 6/2020 | Beaurepaire | ........... | G06Q 50/40 |
| 2021/0125035 A1* | 4/2021 | Wachira | ................... | G06N 3/08 |
| 2022/0165150 A1* | 5/2022 | Xu | ....................... | G08G 1/0129 |

FOREIGN PATENT DOCUMENTS

| | | |
|---|---|---|
| JP | 2014-183656 A | 9/2014 |
| JP | 2017152964 A | 8/2017 |
| JP | 2019503152 A | 1/2019 |
| JP | 2019106061 A | 6/2019 |
| JP | 2019128239 A | 8/2019 |
| WO | 2017130244 A2 | 8/2017 |

* cited by examiner

DATA COLLECTION DEVICE, DATA COLLECTION METHOD, AND DATA COLLECTION SYSTEM

CROSS-REFERENCE TO RELATED APPLICATION

This application claims priority to Japanese Patent Application No. 2021-118938 filed on Jul. 19, 2021, incorporated herein by reference in its entirety.

BACKGROUND

1. Technical Field

The present disclosure relates to a data collection device, a data collection method, and a data collection system.

2. Description of Related Art

Conventionally, a method for effectively utilizing big data acquired by acquiring a large amount of data in a predetermined target area such as a smart city has been studied.

For example, Japanese Unexamined Patent Application Publication No. 2014-183656 (JP 2014-183656 A) describes a demand prediction system that predicts a demand (energy demand amount) on a specified prediction date of a specified community based on actual demand data for each of a plurality of communities. Further, in the demand prediction system described in JP 2014-183656 A, the predicted demand is corrected in accordance with an event that occurs on the prediction date so that a specific demand fluctuation that specifically occurs (for example, a guerrilla rainstorm, a concert being held, etc.) is taken into consideration.

SUMMARY

As described above, in the demand prediction system described in JP 2014-183656 A, the demand of one community as a whole is predicted. However, depending on what happens within the community, it may be desirable to acquire data at a specific location within the community.

Further, in the demand prediction system described in JP 2014-183656 A, the demand on the prediction date is predicted based on the past data. Thus, even when the predicted demand is corrected in accordance with the event, the demand prediction accuracy may be insufficient.

In view of the above problems, the object of the present disclosure is to appropriately set the data collection location in the target area in accordance with the fluctuation of the data demand and quickly acquire the desired data.

The gist of the present disclosure is as follows.

(1) A data collection device that collects data in a predetermined target area using a plurality of mobile bodies that is able to move within the target area and acquire data, the data collection device including: an information acquisition unit that acquires area information regarding the target area; and a mobile body management unit that changes a collection location of the data based on the area information and that dispatches at least one mobile body among the mobile bodies to a specific location in the target area associated with the area information.

(2) The data collection device according to (1) described above, in which the area information is holding information of an event to be held in the target area, and in which the specific location is a location related to the event.

(3) The data collection device according to (2) described above, in which the mobile body management unit sets the number of mobile bodies dispatched to a location related to the event to be larger than the number of mobile bodies dispatched to a location other than the location related to the event.

(4) The data collection device according to (2) or (3) described above, further including an information distribution unit that distributes predetermined information acquired based on data acquired by the at least one mobile body at the location related to the event.

(5) The data collection device according to (4) described above, in which the location related to the event is a vehicle stopping point of a transportation facility near a venue of the event, and in which the predetermined information is a congestion degree of the transportation facility.

(6) The data collection device according to (4) described above, in which the location related to the event is a vehicle stopping point of a transportation facility near a venue of the event, and in which the predetermined information is a transportation facility recommended as a moving method to the venue of the event.

(7) The data collection device according to (6) described above, in which the information distribution unit determines the recommended transportation facility based on the data acquired by the at least one mobile body at the location related to the event and resident information regarding a resident of the target area.

(8) The data collection device according to (1) described above, in which the area information is occurrence information of a disaster in the target area, and in which the specific location is a location related to the disaster.

(9) The data collection device according to (8) described above, in which the mobile body management unit sets the number of mobile bodies dispatched to a location related to the disaster to be larger than the number of mobile bodies dispatched to a location other than the location related to the disaster.

(10) The data collection device according to (8) or (9) described above, further including an information distribution unit that distributes predetermined information acquired based on data acquired by the at least one mobile body at the location related to the disaster.

(11) The data collection device according to (10) described above, in which the predetermined information is evacuation information.

(12) The data collection device according to (11) described above, in which the information distribution unit creates an evacuation path from a residence or a current location of the resident based on the data acquired by the at least one mobile body at the location related to the disaster and resident information regarding a resident of the target area, and distributes the evacuation path to the resident as the evacuation information.

(13) The data collection device according to (11) or (12) described above, in which the information distribution unit identifies an evacuation target person who is residing or staying in an evacuation target area identifies from the area information, based on the resident information regarding the resident of the target area, and distributes the evacuation information to the evacuation target person.

(14) The data collection device according to any one of (1) to (3), (8) and (9) described above, further including an information distribution unit that distributes predetermined information acquired based on data acquired by the at least one mobile body at the specific location.

(15) The data collection device according to (14) described above, in which the information distribution unit determines the acquired predetermined information based on the data acquired by the at least one mobile body at the specific location and resident information regarding a resident of the target area.

(16) The data collection device according to (14) or (15) described above, in which the information distribution unit distributes the predetermined information to the resident in response to a request from the resident in the target area.

(17) The data collection device according to any one of (14) to (16) described above, in which the information distribution unit determines a distribution destination of the predetermined information based on the resident information regarding the resident of the target area.

(18) A data collection method that collects data in a predetermined target area using a plurality of mobile bodies that is able to move within the target area and acquire data, in which the data collection device acquires area information regarding the target area, and changes a collection location of the data based on the area information and that dispatches at least one mobile body among the mobile bodies to a specific location in the target area associated with the area information.

(19) A data collection system that collects data in a predetermined target area, the data collection system including: a plurality of mobile bodies that is able to move within the target area and acquire data; and a server that is able to communicate with the mobile bodies, in which the server includes: an information acquisition unit that acquires area information regarding the target area; and a mobile body management unit that changes a collection location of the data based on the area information and that dispatches at least one mobile body among the mobile bodies to a specific location in the target area associated with the area information.

According to the present disclosure, it is possible to appropriately set a data collection location in a predetermined target area in accordance with a data demand fluctuation and quickly acquire the desired data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described below with reference to the drawings. In the following description, similar components are given the same reference numbers.

First Embodiment

First, the first embodiment of the present disclosure will be described with reference to FIGS. 1 to 5.

Figure 1:
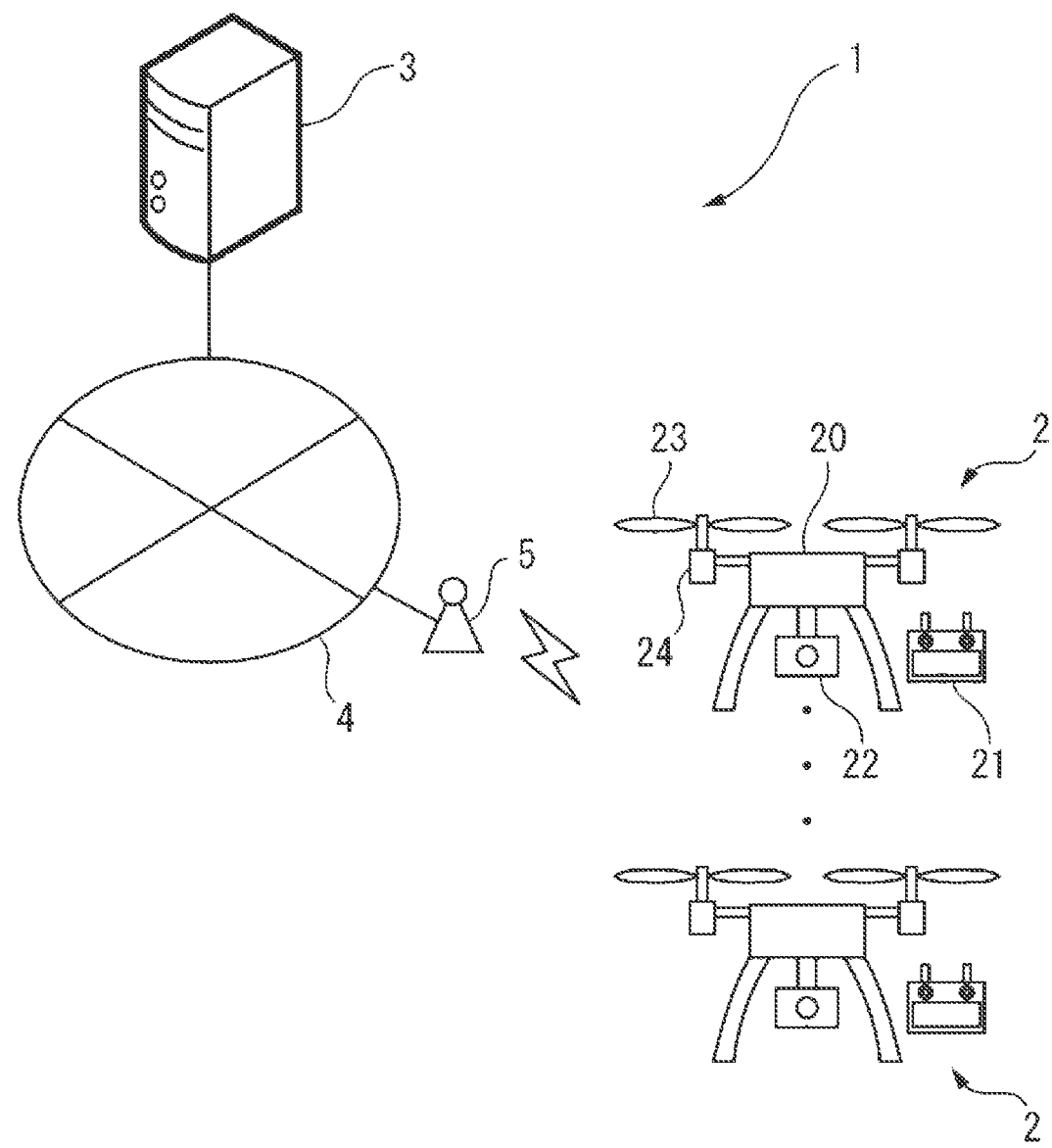
FIG. 1 is a schematic configuration diagram of a data collection system according to the first embodiment of the present disclosure.

FIG. 1 is a schematic configuration diagram of a data collection system 1 according to the first embodiment of the present disclosure. As shown in FIG. 1, the data collection system 1 includes a plurality of drones 2 and a server 3. The data collection system 1 collects data in a predetermined target area. The target area is a range surrounded by predetermined boundaries, for example, a smart city defined as "a sustainable city or district where management (planning, maintenance, management, operation, etc.) is performed while utilizing new technologies such as ICT for various problems in the city, and where the overall optimization is achieved."

Each of the drones 2 moves within the predetermined target area and acquires data. The server 3 uses the drones 2 to collect data in the predetermined target area. The drone 2 is an example of a mobile body, and the server 3 is an example of a data collection device.

The drones 2 each have a similar configuration. Since the configuration of the drone 2 is known, the configuration will be briefly described below.

The drone 2 includes a drone main body 20 and a transmitter 21 provided separately from the drone main body 20. The drone main body 20 includes a camera 22, a propeller (blade) 23, a motor 24, an electronic speed controller (ESC), a flight controller, a receiver, sensors (gyro sensor, acceleration sensor, pressure sensor, GNSS receiver, etc.) and the like.

The camera 22 captures the surroundings of the drone main body 20 and generates an image. In the present embodiment, the camera 22 is an IP camera (network camera) capable of wirelessly transmitting an image generated by the camera 22. Therefore, the drone 2 can deliver the image generated by the camera 22 in real time. In the present embodiment, the drone 2 transmits the images generated by the camera 22 to the server 3 at predetermined intervals via a radio base station 5 and a communication network 4.

The propeller 23 is rotationally driven by the motor 24, and the rotation of the propeller 23 enables the drone main body 20 to fly. The flight controller executes various controls of the drone 2 and controls the rotation speed of the motor 24 via the ESC, for example.

The transmitter 21 is operated by the operator of the drone 2, and the operator controls the flight state of the drone main body 20 via the transmitter 21. The command input to the transmitter 21 by the operator is wirelessly transmitted to the receiver provided in the drone main body 20. The flight controller controls the rotation speed of the motor 24 so that the requested flight state is realized, based on the command transmitted from the transmitter 21 to the receiver, the output of the sensor of the drone 2, and the like.

Figure 2:
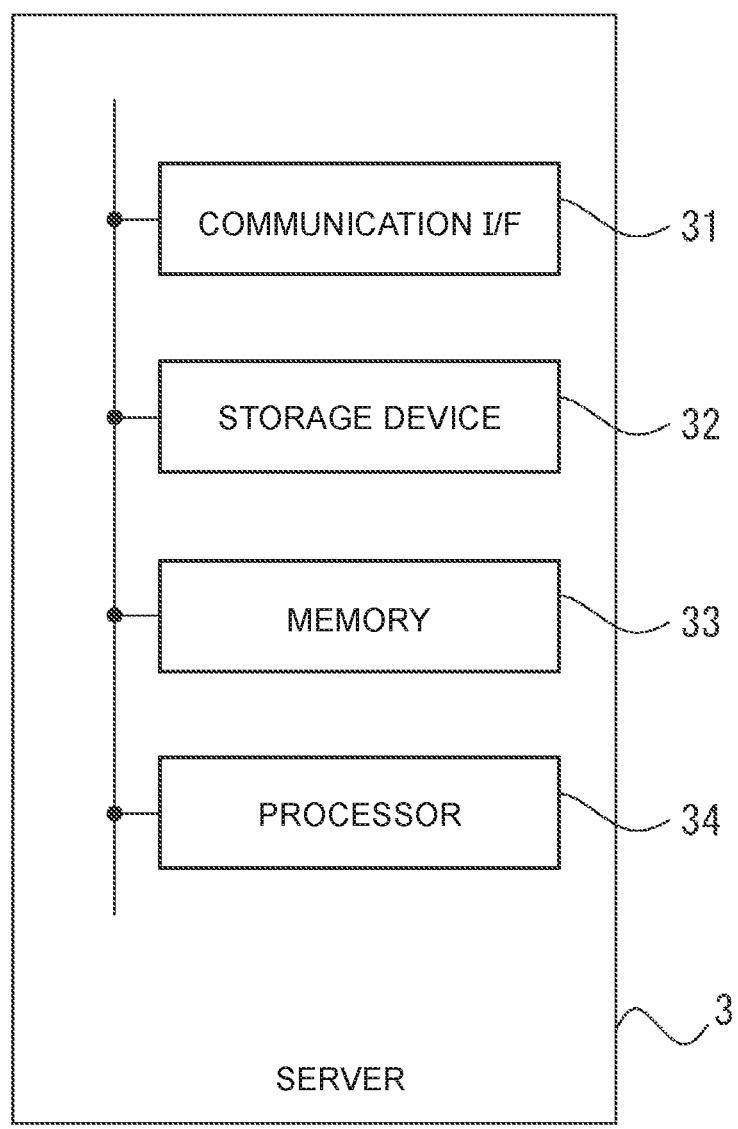
FIG. 2 is a diagram schematically showing the configuration of a server of FIG. 1.

FIG. 2 is a diagram schematically showing the configuration of the server 3 of FIG. 1. The server 3 includes a communication interface 31, a storage device 32, a memory 33, and a processor 34. The communication interface 31, the storage device 32, and the memory 33 are connected to the processor 34 via a signal line. The server 3 may further include an input device such as a keyboard and a mouse, an output device such as a display, and the like. Further, the server 3 may be composed of a plurality of computers.

The communication interface 31 has an interface circuit for connecting the server 3 to the communication network 4. The server 3 communicates with the outside (for example, the drone 2) of the server 3 via the communication network 4 and the radio base station 5. The communication interface 31 is an example of the communication unit of the server 3.

The storage device 32 includes, for example, a hard disk drive (HDD), a solid state drive (SDD) or an optical recording medium, and an access device thereof. The storage device 32 stores various data, for example, map information, drone information (for example, identification numbers and the current positions of each of the drones 2), data acquired by the drone 2, and computer programs for the processor 34 to execute various processes. The storage device 32 is an example of a storage unit of the server 3.

The memory 33 has a non-volatile semiconductor memory (for example, RAM). The memory 33 temporarily stores various data and the like used when various processes are executed by the processor 34, for example. The memory 33 is an example of a storage unit of the server 3.

The processor 34 has one or more CPUs and peripheral circuits thereof, and executes various processes. The processor 34 may further include other arithmetic circuits such as a logical operation unit, a numerical operation unit, or a graphic processing unit.

Figure 3:
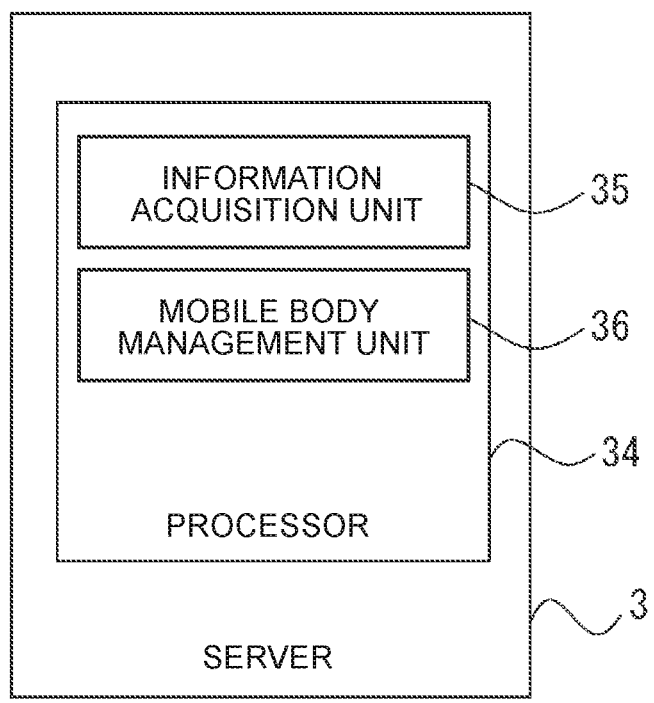
FIG. 3 is a functional block diagram of a processor of the server according to the first embodiment.

FIG. 3 is a functional block diagram of the processor 34 of the server 3 in the first embodiment. In the present embodiment, the processor 34 has an information acquisition unit 35 and a mobile body management unit 36. The information acquisition unit 35 and the mobile body management unit 36 are functional modules realized by the processor 34 of the server 3 executing the computer program stored in the storage device 32 of the server 3. It should be noted that each of these functional modules may be realized by a dedicated arithmetic circuit provided in the processor 34.

The information acquisition unit 35 acquires area information regarding the predetermined target area. For example, the information acquisition unit 35 acquires the area information based on information acquired by accessing a predetermined website, information transmitted from the outside of the server 3 to the server 3 via the communication network 4, and information input to the server 3 by an operator of the server 3.

The mobile body management unit 36 manages a plurality of mobile bodies that can move within the predetermined target area and acquire data. In the present embodiment, the mobile body management unit 36 manages the drones 2. For example, the mobile body management unit 36 determines the dispatch destination of each of the drones 2, that is, the location where data is acquired by each of the drones 2. The dispatch destination determined by the mobile body management unit 36 is notified to the operator of the drone 2, and the operator moves the drone 2 to the dispatch destination in accordance with a command from the mobile body management unit 36.

For example, the mobile body management unit 36 dispatches the drones 2 to a predetermined location in the target area in accordance with a predetermined schedule in order to acquire data of a predetermined monitoring target in the target area. However, the location where data should be collected using the drone 2 changes depending on the events that occur in the target area. For example, when an event is held in the target area, there is a need for data collection at the location related to the event, and when a disaster occurs in the target area, there is a need for data collection at the location related to the disaster.

Therefore, in the present embodiment, the mobile body management unit 36 changes the data collection location based on the area information acquired by the information acquisition unit 35, and dispatches at least one drone 2 among the drones 2 to a specific location in the target area associated with the area information. As a result, it is possible to appropriately set the data collection location in the target area in accordance with the fluctuation of the data demand and quickly acquire the desired data.

Figure 4:
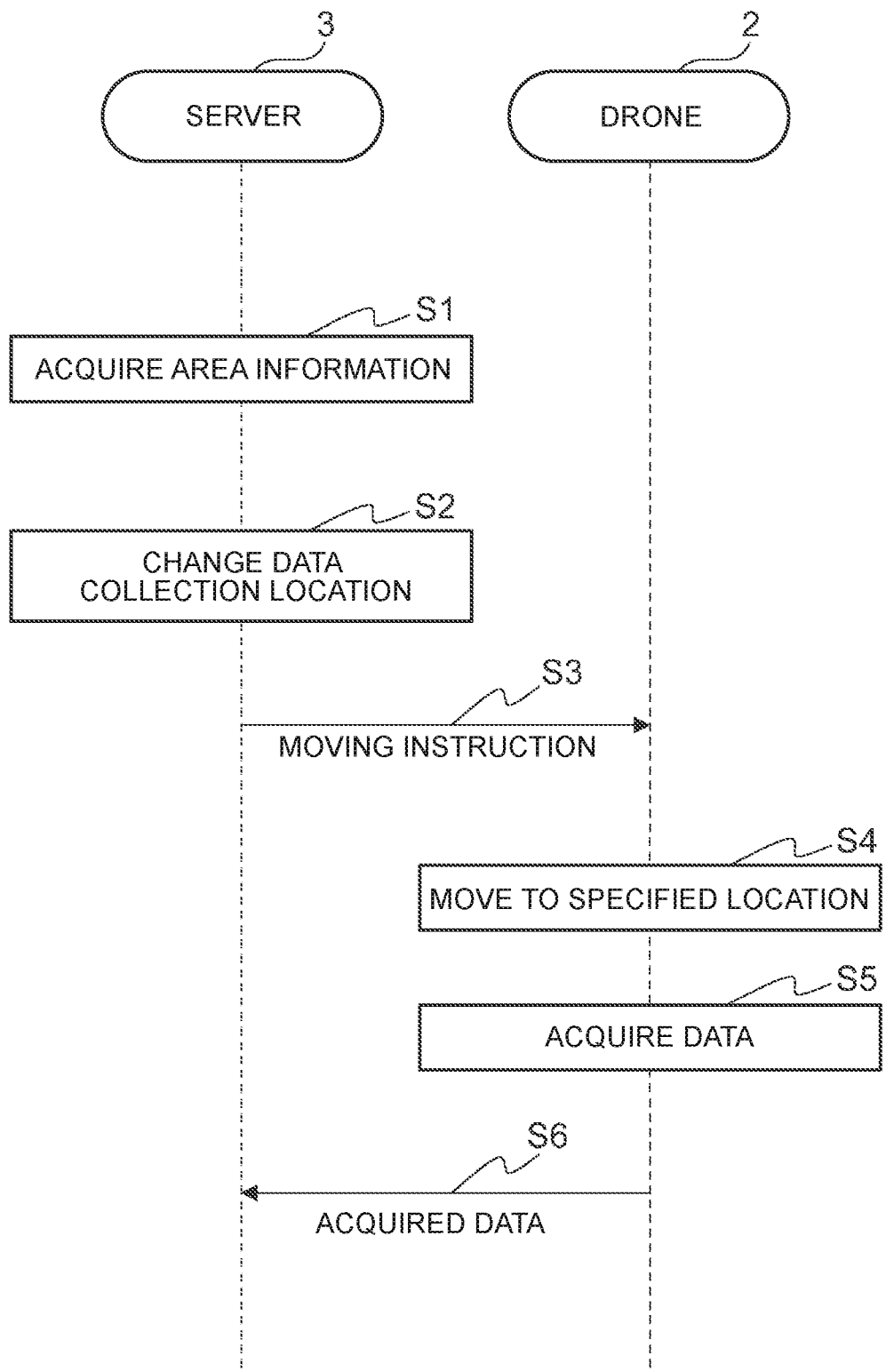
FIG. 4 is a sequence diagram showing an example of processing performed by the data collection system in the first embodiment.

Hereinafter, the above-mentioned control will be specifically described with reference to the sequence diagram of FIG. 4 and the flowchart of FIG. 5. FIG. 4 is a sequence diagram showing an example of processing performed by the data collection system 1 in the first embodiment. In this sequence diagram, communication between the server 3 and the drone 2 is performed via the communication network 4 and the radio base station 5.

When the server 3 acquires the area information regarding the target area (step S1), the server 3 changes the data collection location as necessary based on the area information (step S2). Then, the server 3 instructs at least one drone 2 to move to a specific location in the target area associated with the area information (step S3).

As a result, when the drone 2 receives the moving instruction from the server 3, the operator of the drone 2 moves the drone 2 to a specific location designated by the server 3 (step S4). That is, the dispatch destination of the drone 2 is changed to a specific location associated with the area information. When the drone 2 has acquired data at a predetermined data acquisition point, the drone 2 operator moves the drone 2 from the data acquisition point to a specific location. On the other hand, when the drone 2 is waiting at the waiting location, the operator of the drone 2 moves the drone 2 from the waiting location to a specific location.

When the drone 2 arrives at a specific location designated by the server 3, the drone 2 acquires data at the specific location (step S5). Specifically, the drone 2 acquires an image of the specific location by using the camera 22. The data acquired by the drone 2 is transmitted from the drone 2 to the server 3 at predetermined intervals (step S6).

Figure 5:
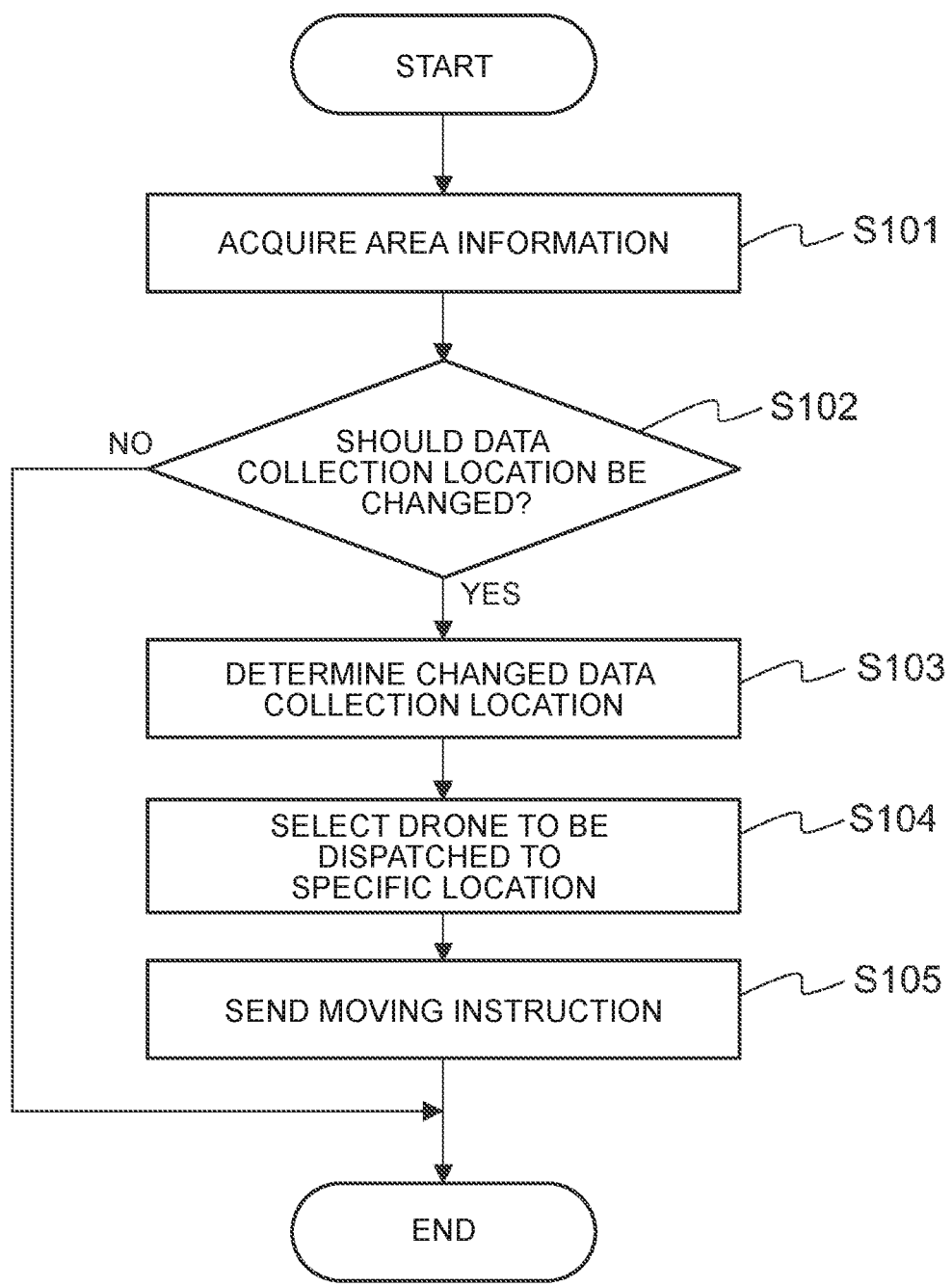
FIG. 5 is a flowchart showing a control routine executed on the server in the first embodiment.

FIG. 5 is a flowchart showing a control routine executed by the server 3 in the first embodiment. This control routine is repeatedly executed by the processor 34 of the server 3.

First, in step S101, the information acquisition unit 35 acquires the area information regarding the target area. For example, the information acquisition unit 35 acquires the area information by accessing a predetermined website via the communication network 4. The information acquisition unit 35 may acquire the area information by receiving the area information from the outside of the server 3 via the communication network 4. Further, the information acquisition unit 35 may acquire the area information by reading the information input to the server 3 by the operator of the server 3, and the like. The area information is, for example, holding information of an event held in the target area.

Next, in step S102, the mobile body management unit 36 determines whether the data collection location should be changed based on the area information acquired by the information acquisition unit 35. For example, the mobile body management unit 36 determines that the data collection location should be changed when the event holding information includes an event that starts within a predetermined time. When it is determined in step S102 that it is not necessary to change the data collection location, this control routine ends. On the other hand, when it is determined in step S102 that the data collection location should be changed, the control routine proceeds to step S103.

In step S103, the mobile body management unit 36 determines the collection location of the changed data. Specifically, the mobile body management unit 36 selects a specific location in the target area associated with the area information as the data collection location after the change. For example, when the area information is event holding information, the specific location is a location related to the event such as an event holding venue, a transportation facility stop near the event holding venue, and the like.

Next, in step S104, the mobile body management unit 36 selects, among the drones 2, the drone 2 that is to be dispatched to a specific location associated with the area information. At this time, as the drone 2 dispatched to a specific location, the drone 2 whose current position is close to the specific location is preferentially selected over the drone 2 whose current position is far from the specific location. For example, when one drone 2 is dispatched to a specific location, the drone 2 whose current position is closest to the specific location is selected. Thus, it is possible to quickly start collecting data at a specific location.

The mobile body management unit 36 may set the number of drones 2 dispatched to a specific location to be larger than the number of drones 2 dispatched to a location other than the specific location. This makes it possible to enhance data collection at a specific location associated with the area information in situations where the number of drones 2 used for data collection is limited. In addition, a plurality of locations may be selected as a specific location associated with the area information.

Next, in step S105, the mobile body management unit 36 transmits a moving instruction to the drone 2 whose dispatch destination has been changed via the communication network 4 and the radio base station 5. For example, the moving instruction includes map information of a specific location. When the drone 2 receives the moving instruction, the map information of the specific location is displayed on the display of the transmitter 21 of the drone 2, and the moving instruction of the drone 2 is notified to the operator of the drone 2.

The mobile body management unit 36 may transmit a moving instruction to the mobile terminal attached to the transmitter 21 of the drone 2 or the mobile terminal owned by the operator of the drone 2 via the communication network 4 and the radio base station 5. In this case, the operator of the drone 2 is notified of the moving instruction of the drone 2 via the mobile terminal. The mobile terminal is, for example, a smartphone, a tablet terminal, a personal computer, or the like. After step S105, this control routine ends.

The area information acquired by the information acquisition unit 35 may be disaster occurrence information or the like in the target area. Disasters include natural disasters (earthquakes, storms, heavy rains, heavy snowfalls, eruptions, floods, storm surges, tsunamis, landslides, etc.) and man-made disasters (traffic accidents, power outages due to work mistakes, etc.). In this case, in step S102, the mobile body management unit 36 determines that the data collection location should be changed when a new disaster occurs in the target area. Further, in this case, the specific location in the target area associated with the area information is a location related to a disaster, for example, a disaster occurrence point, a river, a highway, a railroad track, or the like. The location related to the disaster may be predetermined for each type of disaster occurring in the target area.

Second Embodiment

The data collection system in accordance with the second embodiment is basically the same as the configuration and control of the data collection system in accordance with the first embodiment, except for the points described below. Therefore, hereinafter, the second embodiment of the present disclosure will be described focusing on the parts different from the first embodiment.

Figure 6:
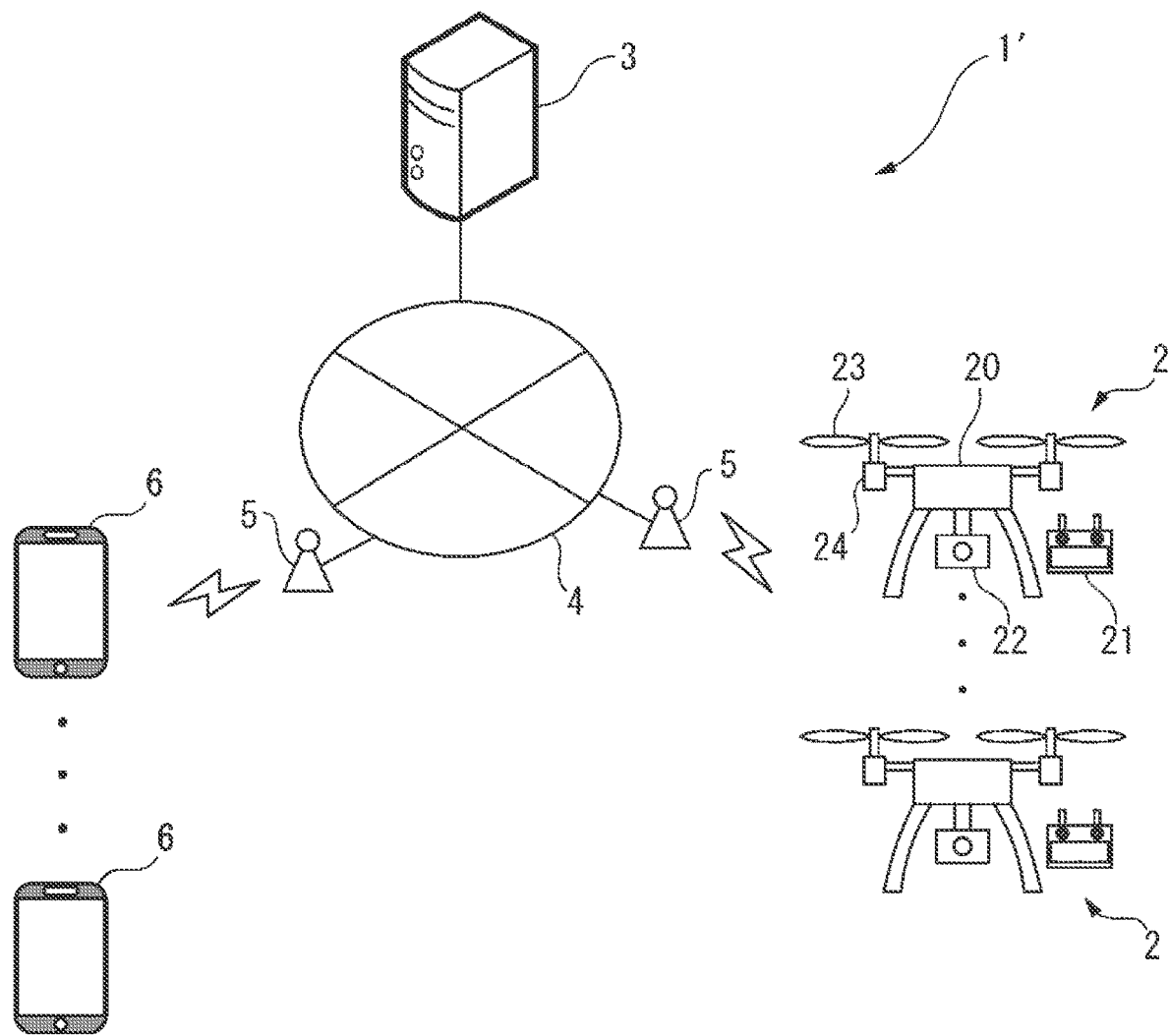
FIG. 6 is a schematic configuration diagram of the data collection system according to the second embodiment of the present disclosure.

FIG. 6 is a schematic configuration diagram of a data collection system 1' according to the second embodiment of the present disclosure. Similar to the first embodiment, the data collection system 1' includes the drones 2 and the server 3. As shown in FIG. 6, in the second embodiment, the server 3 can communicate with the user terminal 6 via the communication network 4 and the radio base station 5. The user terminal 6 is owned by a resident of an area where data is collected by the data collection system 1', that is, a resident of the predetermined target area such as a smart city. In the second embodiment, the data collection system 1' provides an information distribution service to residents and the like in the target area.

Figure 7:
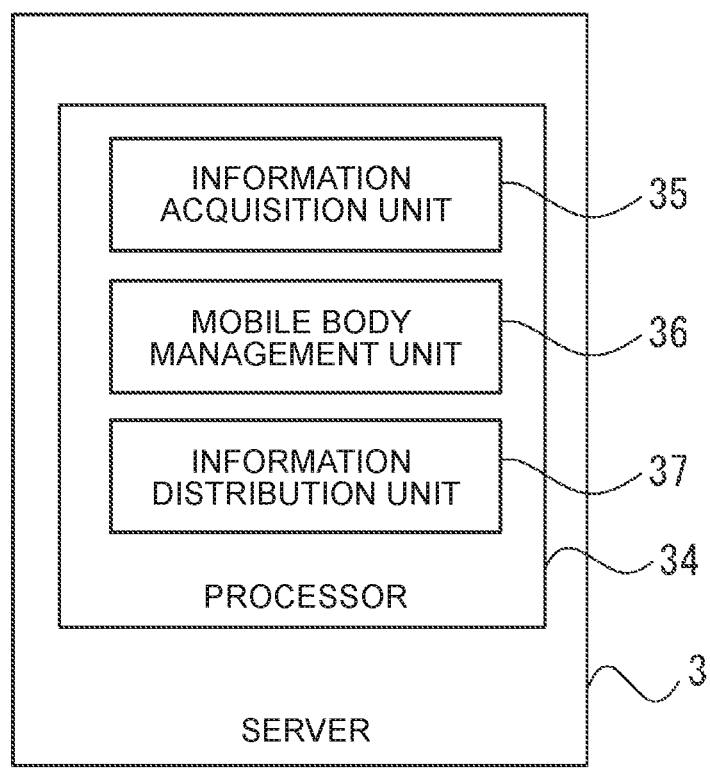
FIG. 7 is a functional block diagram of the processor of the server according to the second embodiment.

FIG. 7 is a functional block diagram of the processor 34 of the server 3 in the second embodiment. In the second embodiment, the processor 34 has an information distribution unit 37 in addition to the information acquisition unit 35 and the mobile body management unit 36. The information acquisition unit 35, the mobile body management unit 36, and the information distribution unit 37 are functional modules realized by the processor 34 of the server 3 executing the computer program stored in the storage device 32 of the server 3. It should be noted that each of these functional modules may be realized by a dedicated arithmetic circuit provided in the processor 34.

The information distribution unit 37 distributes predetermined information acquired based on the data acquired by the drone 2 at a specific location associated with the area information. As a result, it is possible to effectively utilize the data appropriately acquired in accordance with the fluctuation of the demand for the data.

Figure 8:
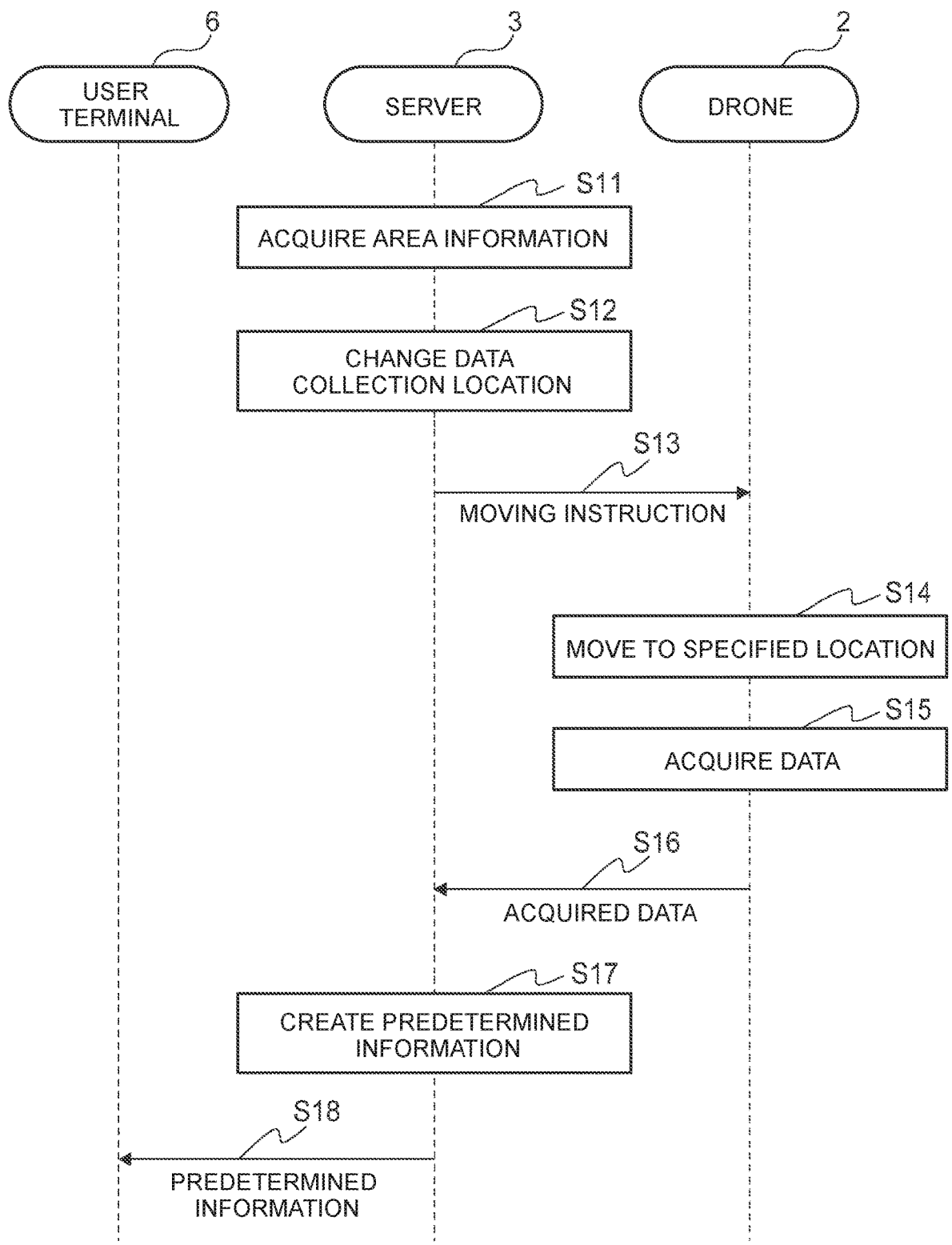
FIG. 8 is a sequence diagram showing an example of processing performed by the data collection system in the second embodiment.

Hereinafter, the above-mentioned control will be specifically described with reference to the sequence diagram of FIG. 8 and the flowchart of FIG. 9. FIG. 8 is a sequence diagram showing an example of processing performed by the data collection system 1' in the second embodiment. In this sequence diagram, the communication between the server 3 and the drone 2 and the communication between the server 3 and the user terminal 6 are performed via the communication network 4 and the radio base station 5.

In the sequence diagram of FIG. 8, steps S11 to S16 are executed in the same manner as steps S1 to S6 of FIG. 4. When the server 3 receives data from the drone 2 dispatched to a specific location associated with the area information (step S16), the server 3 creates predetermined information based on the data transmitted from the drone 2 (step S17). Then, the server 3 transmits the predetermined information to the user terminal 6 and distributes the predetermined information (step S18). As a result, the resident of the target area can receive the predetermined information via the user terminal 6.

Figure 9:
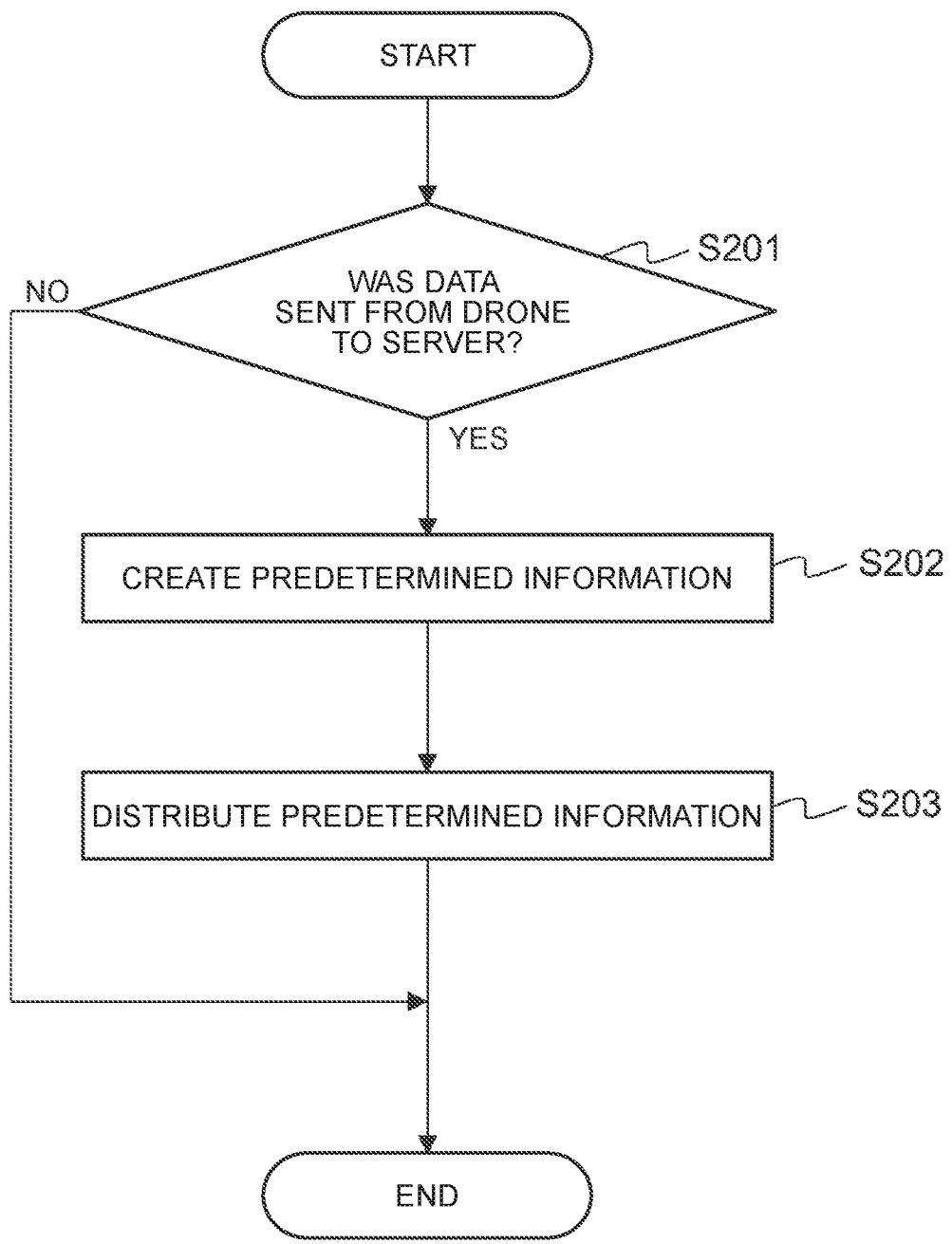
FIG. 9 is a flowchart showing a control routine executed on the server in the second embodiment.

In the second embodiment, in addition to the control routine of FIG. 5, the control routine of FIG. 9 is executed on the server 3. The control routine of FIG. 9 is repeatedly executed by the processor 34 of the server 3.

First, in step S201, the information distribution unit 37 determines whether data has been transmitted from the drone 2 dispatched to a specific location associated with the area information to the server 3. When it is determined that no data has been transmitted, this control routine ends. On the other hand, when it is determined that the data has been transmitted, the control routine proceeds to step S202.

In step S202, the information distribution unit 37 creates the predetermined information based on the data transmitted from the drone 2. For example, when the specific location where the data is acquired by the drone 2 is a stop of the transportation facility near the venue of the event, the predetermined information is the congestion degree of the transportation facility.

When the specific location where the data was acquired by the drone 2 is a stop of the transportation facility near the event venue, the predetermined information may be the transportation facility recommended as a moving method to the event venue. In this case, when the congestion degree at the stop estimated from the data such as the image is less than the predetermined value, the transportation facility that stops at the stop (for example, trains, buses (route buses, shuttle buses, etc.)) is recommended as a moving method, and when the congestion degree at the stop is equal to or higher than the predetermined value, an alternative transportation facility other than the transportation facility that stops at the stop is recommended as the moving method. When the drones 2 are dispatched to a plurality of different stops, the transportation facility that stops at the stop with the lowest congestion degree is recommended as the moving method.

Further, when the specific location where the data is acquired by the drone 2 is a location related to a disaster, the information distribution unit 37 creates evacuation information as the predetermined information. The evacuation information includes the damage situation, evacuation route, risk level, presence or absence of victims, and the like.

Next, in step S203, the information distribution unit 37 distributes the predetermined information. For example, the information distribution unit 37 transmits the predetermined information to the user terminal 6 via the communication network 4 and the radio base station 5. That is, the information distribution unit 37 distributes the predetermined information to the resident in the target area that owns the user terminal 6.

The information distribution unit 37 may distribute the predetermined information to a person other than the resident of the target area. For example, the information distribution unit 37 may distribute the predetermined information (for example, the congestion degree of the event, the participant information of the event (age group, gender, presence or absence of a wheelchair), and the like) to the organizer of the event held in the target area. In addition, the information distribution unit 37 may distribute the evacuation information to public organizations (Japan Meteorological Agency, Ministry of Land, Infrastructure, Transport and Tourism, and the like), news organizations, and the like.

Further, the information distribution unit 37 may distribute the predetermined information by using a social networking service (SNS) or the like. After step S203, this control routine ends.

Third Embodiment

The data collection system according to the third embodiment is basically the same as the configuration and control of the data collection system according to the second embodiment, except for the points described below. Therefore, hereinafter, the third embodiment of the present disclosure will be described focusing on the parts different from the second embodiment.

In the second embodiment, as described above, the predetermined information acquired based on the data acquired by the drone 2 is delivered to the residents and the like in the target area. However, the optimal information varies from resident to resident. Therefore, it is desirable to deliver customized information for each resident.

Therefore, in the third embodiment, the information distribution unit 37 distributes to the resident of the target area, data acquired by the drone 2 in the specific location in the target area associated with the area information, and the predetermined information acquired based on the resident information regarding the resident of the target area. As a result, more appropriate information can be distributed to the resident, and the satisfaction level with the information distribution service can be increased.

Figure 10:
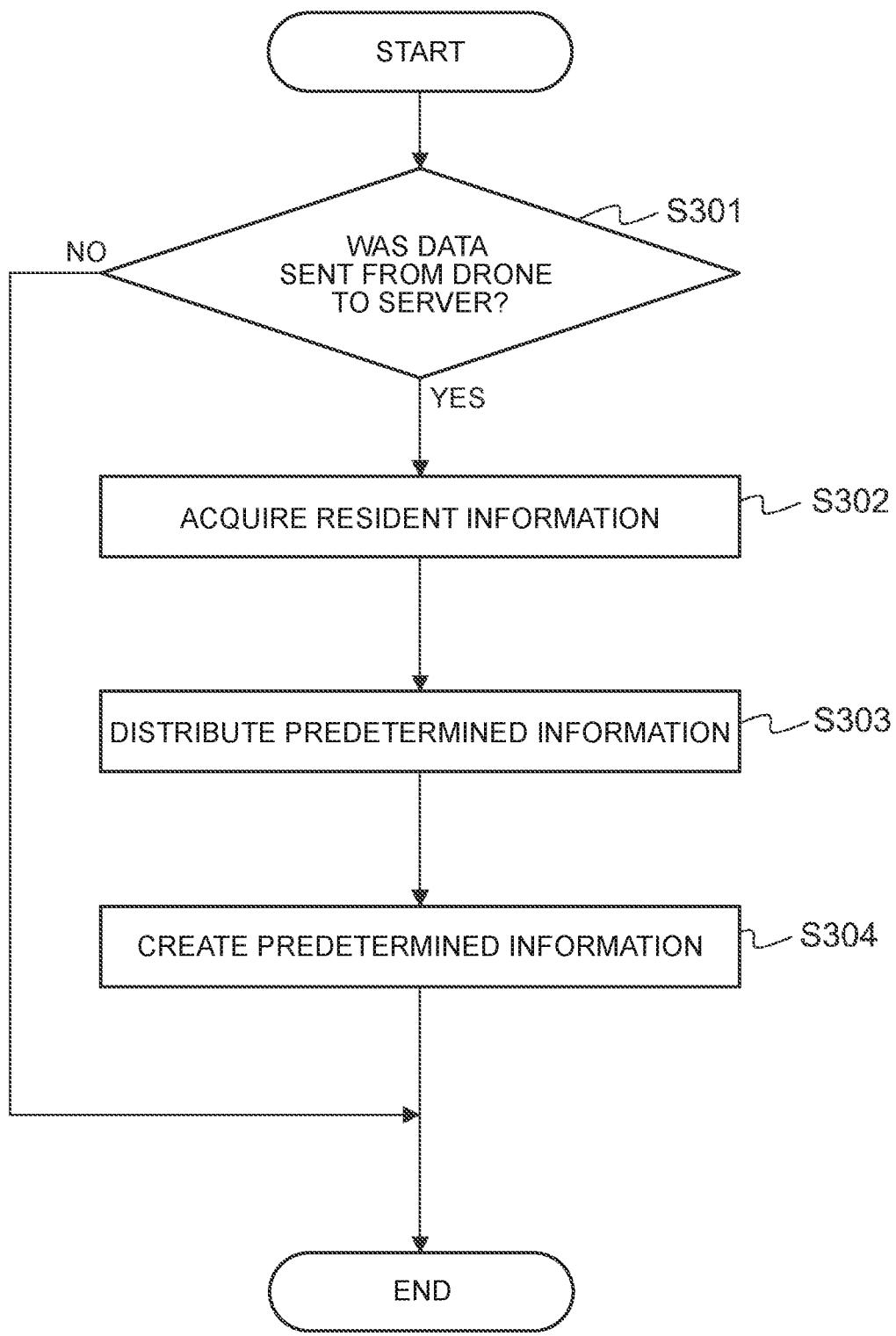
FIG. 10 is a flowchart showing a control routine executed on the server in the third embodiment.

In the third embodiment, in addition to the control routine of FIG. 5, the control routine of FIG. 10 is executed on the server 3. The control routine of FIG. 10 is repeatedly executed by the processor 34 of the server 3.

First, in step S301, similar to step S201 of FIG. 9, the information distribution unit 37 determines whether the data has been transmitted to the server 3 from the drone 2 that is dispatched to a specific location associated with the area information. When it is determined that no data has been transmitted, this control routine ends. On the other hand, when it is determined that the data has been transmitted, the control routine proceeds to step S302.

In step S302, the information distribution unit 37 acquires the resident information regarding the resident of the target area. In the target area such as a smart city, each resident of the target area registers the resident information in advance via an input device such as the user terminal 6, and the resident information is stored in the storage device 32 or the like of the server 3. Therefore, the information distribution unit 37 acquires the resident information stored in the storage device 32 of the server 3.

Next, in step S303, the information distribution unit 37 creates the predetermined information for each of the residents in the target area based on the data transmitted from the drone 2 and the resident information. In other words, the information distribution unit 37 creates the predetermined information by combining the data acquired by the drone 2 with the resident information of each resident of the target area. For example, the information distribution unit 37 determines the moving method that is recommended as a transportation facility to the event venue, based on the resident information and the data acquired by the drone 2 at the stop of the transportation facility near the event venue. That is, the information distribution unit 37 determines the recommended transportation facility in consideration of not only the congestion degree at the stop, but also the place of residence of the resident included in the resident information, whether a wheelchair is used, and the like.

Further, the information distribution unit 37 may create an evacuation route from the location of residence of the resident in the target area as the evacuation information, based on the data acquired by the drone 2 at the location related to the disaster and the resident information. Further, when the current position of the resident is periodically transmitted from the user terminal 6 to the server 3 as resident information, the information distribution unit 37 may create an evacuation route from the current position of the resident in the target area as the evacuation information, based on the data acquired by the drone 2 at the location related to the disaster and the resident information.

Next, in step S304, the information distribution unit 37 distributes the predetermined information created for each resident of the target area to the resident. Specifically, via the communication network 4 and the radio base station 5, the information distribution unit 37 transmits the predetermined information to the user terminal 6 associated with each resident. After step S304, this control routine ends.

Fourth Embodiment

The data collection system according to the fourth embodiment is basically the same as the configuration and control of the data collection system according to the second embodiment, except for the points described below. Therefore, hereinafter, the fourth embodiment of the present disclosure will be described focusing on the parts different from the second embodiment.

In the second embodiment, as described above, the predetermined information acquired based on the data acquired by the drone 2 is delivered to the residents and the like in the target area. However, information that is useful to some residents may not be useful to other residents.

Therefore, in the fourth embodiment, the information distribution unit 37 determines the distribution destination of the predetermined information based on the resident information regarding the resident of the target area. As a result, it is possible to distribute information that meets the needs of the resident, and it is possible to increase the satisfaction level with the information distribution service.

Figure 11:
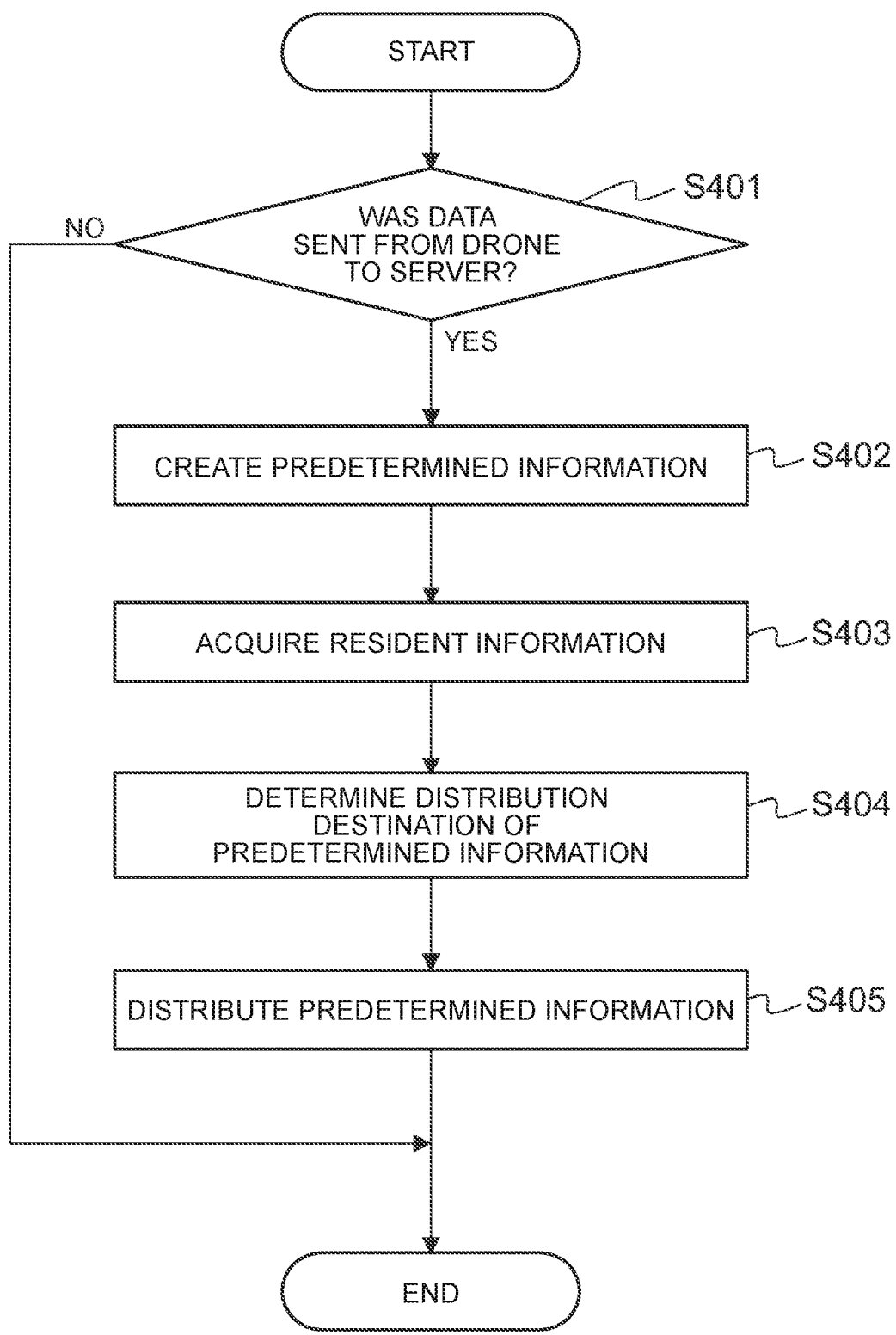
FIG. 11 is a flowchart showing a control routine executed on the server in the fourth embodiment.

In the fourth embodiment, in addition to the control routine of FIG. 5, the control routine of FIG. 11 is executed on the server 3. The control routine of FIG. 11 is repeatedly executed by the processor 34 of the server 3.

First, in step S401, similar to step S201 of FIG. 9, the information distribution unit 37 determines whether the data has been transmitted to the server 3 from the drone 2 that is dispatched to a specific location associated with the area information. When it is determined that no data has been transmitted, this control routine ends. On the other hand, when it is determined that the data has been transmitted, the control routine proceeds to step S402.

In step S402, similar to step S202 of FIG. 9, the information distribution unit 37 creates the predetermined information based on the data transmitted from the drone 2. Next, in step S403, the information distribution unit 37 acquires the resident information regarding the resident of the target area, as in step S302 of FIG. 10.

Next, in step S404, the information distribution unit 37 determines the distribution destination of the predetermined information based on the resident information. For example, when the predetermined information is information about an event, the resident who has a high degree of interest in the event is selected as the delivery destination of the predetermined information. In this case, for example, whether the person is interested in the event is registered in advance as the resident information. In addition, when the event is targeted at specific people, the target people of the event may be extracted based on the resident information (for example, the age, gender, preference, etc. of the resident), and the extracted target people may be selected as the distributing destination of the predetermined information.

In addition, the information distribution unit 37 may identify the evacuation target person who lives in the evacuation target area specified from the area information, based on the resident information (resident's address), and may select the evacuation target person as the distribution destination of the predetermined information. Further, when the current position of the resident is periodically transmitted from the user terminal 6 to the server 3 as resident information, the information distribution unit 37 may identify the evacuation target person who is staying in the evacuation target area, based on the current position of the resident, and may select the evacuation target person as the distribution destination of the predetermined information.

Next, in step S405, the information distribution unit 37 distributes the predetermined information to the resident determined as the distribution destination. Specifically, via the communication network 4 and the radio base station 5, the information distribution unit 37 transmits the predetermined information to the user terminal 6 associated with the resident determined as the distribution destination. After step S405, the control routine ends.

Fifth Embodiment

The data collection system according to the fifth embodiment is basically the same as the configuration and control of the data collection system according to the second embodiment, except for the points described below. Therefore, the fifth embodiment of the present disclosure will be described below, focusing on the parts different from the second embodiment.

In the second embodiment, as described above, the predetermined information acquired based on the data acquired by the drone 2 is delivered to the residents and the like in the target area. However, when information that the resident does not want is frequently delivered to the resident, the resident may feel annoyed.

Thus, in the fifth embodiment, the information distribution unit 37 distributes the predetermined information to the resident in response to a request from the resident in the target area. That is, the information distribution unit 37 distributes the predetermined information to the resident when the resident requests the information distribution. As a result, it is possible to suppress unnecessary information from being frequently distributed, and it is possible to increase the satisfaction level of the information distribution service.

Figure 12:
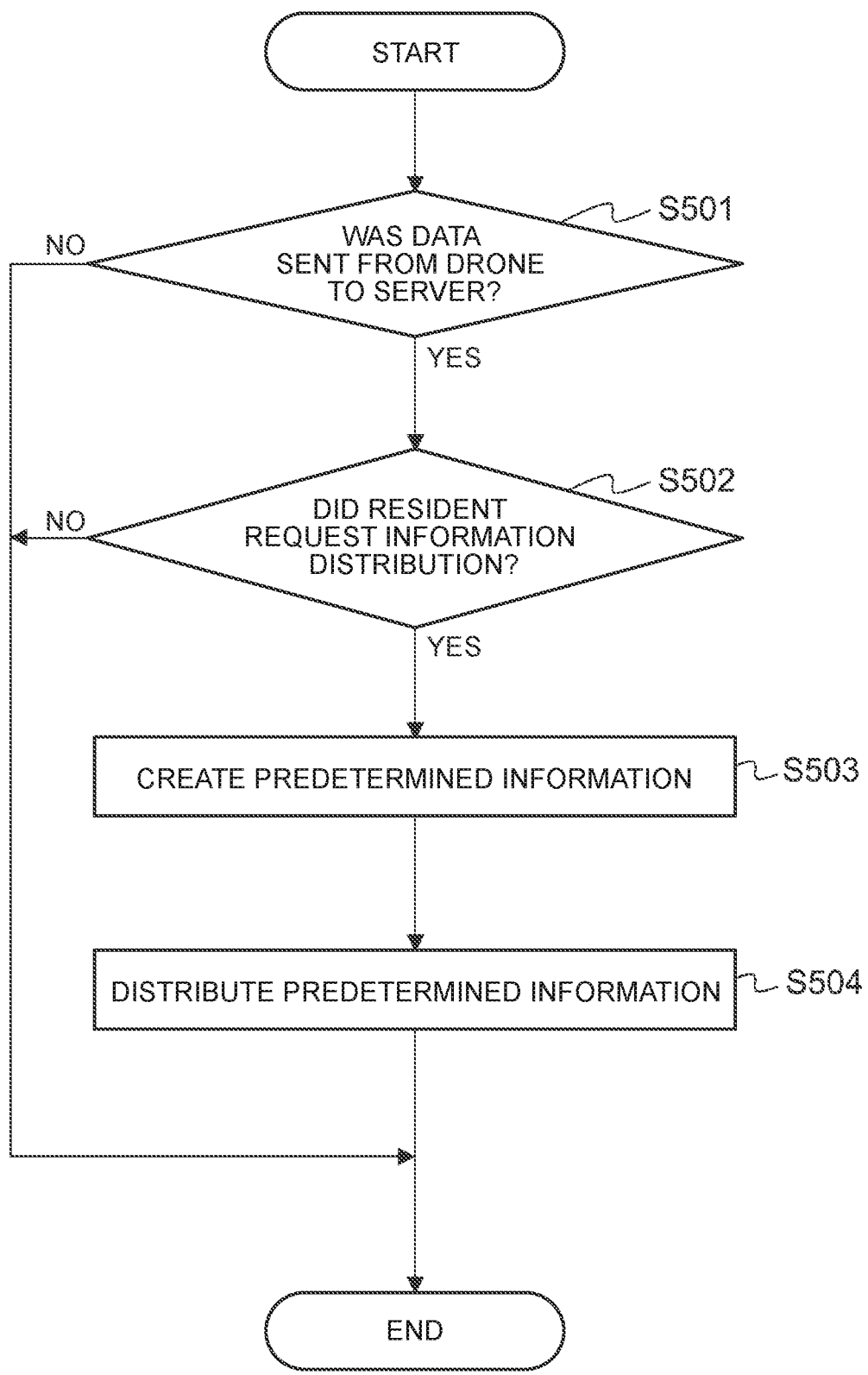
FIG. 12 is a flowchart showing a control routine executed on the server in the fifth embodiment.

In the fifth embodiment, in addition to the control routine of FIG. 5, the control routine of FIG. 12 is executed on the server 3. The control routine of FIG. 12 is repeatedly executed by the processor 34 of the server 3.

First, in step S501, similar to step S201 of FIG. 9, the information distribution unit 37 determines whether the data has been transmitted to the server 3 from the drone 2 that is dispatched to a specific location associated with the area information. When it is determined that no data has been transmitted, this control routine ends. On the other hand, when it is determined that the data has been transmitted, the control routine proceeds to step S502.

In step S502, the information distribution unit 37 determines whether the information distribution is requested by the resident of the target area. For example, the resident requests information distribution using the user terminal 6, and the information distribution unit 37 determines that the resident has requested information distribution when the request signal is transmitted from the user terminal 6 of the resident to the server 3. When it is determined in step S502 that information distribution is not requested by the resident, this control routine ends. On the other hand, when it is determined in step S502 that the information distribution is requested by the resident, the control routine proceeds to step S503.

In step S503, similar to step S202 of FIG. 9, the information distribution unit 37 creates the predetermined information based on the data transmitted from the drone 2. Next, in step S504, the information distribution unit 37 distributes the predetermined information to the resident who requested information distribution. Specifically, via the communication network 4 and the radio base station 5, the information distribution unit 37 transmits the predetermined information to the user terminal 6 associated with the resident who requested the information distribution. After step S504, this control routine ends.

OTHER EMBODIMENTS

Although the preferred embodiments of the present disclosure have been described above, the present disclosure is not limited to these embodiments, and various modifications and modifications can be made within the scope of the claims. For example, the data collection systems 1 and 1' may include a plurality of vehicles as the mobile bodies instead of the drones 2. In this case, each of the vehicles is provided with an outside camera capable of photographing the outside of the vehicle, and an image of the surroundings of the vehicle is acquired as data.

Further, a mobile body such as the drone 2 or a vehicle may acquire audio, temperature, and the like as data in addition to or instead of an image (still image or moving image). When audio is acquired as data, a microphone that receives the surrounding audio is provided on the mobile body, and when the temperature is acquired as data, a thermal camera (infrared camera) that can detect the surrounding temperature is provided on the mobile body.

Further, the mobile body such as the drone 2 or a vehicle may be configured to move autonomously. That is, an autonomous driving drone or an autonomous vehicle may be used as the mobile body. In this case, the mobile body autonomously moves based on the instruction from the mobile body management unit 36 of the server 3 without requiring the operator of the mobile body.

Further, the information distribution unit 37 may use a machine learning model such as a neural network model when analyzing data transmitted from a mobile body such as the drone 2 or a vehicle to create predetermined information. For example, the information distribution unit 37 may use a machine learning model to calculate a congestion degree of the vehicle stopping point from the data (for example, an image) acquired at a vehicle stopping point of the transportation facility near the event venue to determine the recommended moving method to the event venue. Further, the predetermined information distributed by the information distribution unit 37 may be the data (for example, an image) itself acquired by a mobile body such as the drone 2 or a vehicle.

Further, the above-described embodiments can be implemented in any combination. For example, when the third embodiment and the fourth embodiment are combined, step S404 of FIG. 11 is executed between steps S302 and S303 in the control routine of FIG. 10, and in step S303, the information distribution unit 37 creates the predetermined information based on the data transmitted from the drone 2 and the resident information about the resident selected as the delivery destination of the predetermined information.

Further, when the third embodiment and the fifth embodiment are combined, step S502 of FIG. 12 is executed between steps S301 and S302 in the control routine of FIG. 10, and in step S302, the mobile body management unit 36 acquires the resident information about the resident who requested the information distribution.

What is claimed is:

1. A data collection device that collects data in a predetermined target area using a plurality of mobile bodies that is configured to move within the target area and acquire data, the data collection device comprising:
   a processor configured to
      acquire event information for an event held in the target area,
      change a collection location of the data based on the event information and dispatch a first mobile body among the plurality of mobile bodies to a first transportation stop and a second mobile body among the plurality of mobile bodies to a second transportation stop, the first transportation stop and the second transportation stop being located near an event venue of the event held in the target area, and a first transportation means that stops at the first transportation stop being different means of transportation from a second transportation means that stops at the second transportation stop,
      acquire a first congestion degree of the first transportation stop based on data acquired by the first mobile body and a second congestion degree of the second transportation stop based on data acquired by the second mobile body,
      determine a transportation means as a recommended means of transportation to the event venue based on the acquired first congestion degree and the acquired second congestion degree, and
      transmit the determined transportation means to a user terminal as the recommended means of transportation to the event venue.

2. The data collection device according to claim 1, wherein the processor sets the number of mobile bodies dispatched to the first transportation stop and the second transportation stop larger than the number of mobile bodies dispatched to a location other than the first transportation stop and the second transportation stop.

3. The data collection device according to claim 1, wherein when the acquired first congestion degree is less than the predetermined value, the first transportation means is transmitted to the user terminal as the recommended means of transportation to the event venue.

4. A data collection method that collects data in a predetermined target area using a plurality of mobile bodies that is configured to move within the target area and acquire data, the method comprising:
   acquiring event information for an event held in the target area,
   changing a collection location of the data based on the event information and dispatching a first mobile body among the plurality of mobile bodies to a first transportation stop and a second mobile body among the plurality of mobile bodies to a second transportation stop, the first transportation stop and the second transportation stop being located near an event venue of the event held in the target area, and a first transportation means that stops at the first transportation stop being different means of transportation from a second transportation means that stops at the second transportation stop, acquiring a first congestion degree of the first transportation stop based on data acquired by the first mobile body and a second congestion degree of the second transportation stop based on data acquired by the second mobile body, determining a transportation means as a recommended means of transportation to the event venue based on the acquired first congestion degree and the acquired second congestion degree, and transmit the determined transportation means to a user terminal as the recommended means of transportation to the event venue.

5. A data collection system that collects data in a predetermined target area, the data collection system comprising:
   a user terminal;
   a plurality of mobile bodies that is configured to move within the target area and acquire data; and
   a server that is configured to communicate with the plurality of mobile bodies,
   wherein the server includes a processor configured to
   acquire event information for an event held in the target area,
   change a collection location of the data based on the event information and dispatch a first mobile body among the plurality of mobile bodies to a first transportation stop and a second mobile body among the plurality of mobile bodies to a second transportation stop, the first transportation stop and the second transportation stop being located near an event venue of the event held in the target area, and a first transportation means that stops at the first transportation stop being different means of transportation form a second transportation means that stops at the second transportation stop, acquire a first congestion degree of the first transportation stop based on data acquired by the first mobile body and a second congestion degree of the second transportation stop based on data acquired by the second mobile body, determine a transportation means as a recommended means of transportation to the event venue based on the acquired first congestion degree and the acquired second congestion degree, and transmit the determined transportation means to the user terminal as the recommended means of transportation to the event venue.

6. The data collection device according to claim 1, wherein the processor is further configured to change the collection location of the data when the event information indicates that the event will start within a predetermined time.

7. The data collection device according to claim 1, wherein the processor is further configured to compare the first congestion degree with the second congestion degree, and
   the processor is configured to determine a transportation means that stops at a transportation stop with the lower congestion degree as the recommended means of transportation to the event venue.

8. The data collection device according to claim 1, wherein the processor is further configured to acquire user information including whether the user uses a wheelchair, and
   the processor is configured to determine the transportation means based on the acquired user information.

9. The data collection device according to claim 1, wherein the first transportation means is a train and the second transportation means is a bus.

* * * * *